United States Patent

Gruensfelder

[11] Patent Number: 6,079,667
[45] Date of Patent: Jun. 27, 2000

[54] AUXILIARY INLET FOR A JET ENGINE

[75] Inventor: Cynthia Ann Gruensfelder, St. Louis, Mo.

[73] Assignee: McDonnell Douglas Corporation, Huntington Beach, Calif.

[21] Appl. No.: 09/094,299

[22] Filed: Jun. 9, 1998

[51] Int. Cl.[7] ............. B64C 27/18; B64C 29/02; F02K 1/00; F02B 27/00
[52] U.S. Cl. ............. 244/53 B; 244/60; 60/226.1; 60/269; 60/230
[58] Field of Search .............. 244/53 B, 60; 137/15.1, 15.2; 60/224, 226.1, 269, 230

[56] References Cited

U.S. PATENT DOCUMENTS

| | | | |
|---|---|---|---|
| 2,368,702 | 2/1945 | Bourne | 244/130 |
| 2,731,221 | 1/1956 | Holtn | 244/129.5 |
| 2,969,939 | 1/1961 | Sulkin et al. | 244/53 B |
| 2,995,893 | 9/1961 | Morris et al. | 60/246 |
| 3,059,878 | 10/1962 | Kerry et al. | 244/23 B |
| 3,347,496 | 10/1967 | Opfer, Jr. | 244/53 B |
| 3,446,223 | 5/1969 | Hancock | 137/15.2 |
| 3,495,605 | 2/1970 | Gunnarson et al. | 137/15.1 |
| 3,589,379 | 6/1971 | Daues | 137/15.1 |
| 3,664,612 | 5/1972 | Skidmore et al. | 244/53 B |
| 3,915,413 | 10/1975 | Sargisson | 244/53 B |
| 4,012,013 | 3/1977 | Ball et al. | 244/53 B |
| 4,025,008 | 5/1977 | Peikert | 244/53 B |
| 4,474,344 | 10/1984 | Bennet | 244/53 B |
| 4,655,413 | 4/1987 | Genssler et al | 244/53 B |
| 4,892,626 | 1/1990 | Covey | 205/130 |
| 5,222,699 | 6/1993 | Albach et al. | 244/213 |
| 5,301,901 | 4/1994 | Kutschenreuter, Jr. | 244/53 R |
| 5,662,294 | 9/1997 | Maclean et al. | 244/219 |
| 5,803,405 | 9/1998 | Ellis et al. | 244/130 |
| 5,896,191 | 4/1999 | Beier et al. | 356/35.5 |
| 5,927,651 | 7/1999 | Geders et al. | 244/135 B |
| 5,947,417 | 9/1999 | Cameron | 244/129.5 |
| 5,947,422 | 9/1999 | Wille | 244/219 |
| 5,975,466 | 11/1999 | Kahara et al. | 244/135 R |
| 5,979,828 | 11/1999 | Gruensfelder et al. | 244/129.1 |
| 5,988,567 | 11/1999 | Wille | 244/129.5 |

OTHER PUBLICATIONS

U.S. Ser. No. 08/932,947; filed Sep. 17, 1997; (allowed).
U.S. Ser. No. 09/108,858; filed Jul. 1, 1998; (allowed).
U.S. Ser. No. 08/898,162; filed Jul. 22, 1997; (allowed).
U.S. Ser. No. 08/897,341; filed Jul. 21, 1997; (pending).
U.S. Ser. No. 08/576,298; filed Dec. 21, 1995; (allowed) U.S. Pat. No. 5,975,463.
U.S. Ser. No. 08/718,771; filed Sep. 24, 1996; (abandoned).
U.S. Ser. No. 08/718,771; filed Aug. 20, 1998; (pending).
U.S. Ser. No. 08/814,497; filed Mar. 10, 1997; (abandoned)—incomplete file.
U.S. Ser. No. 09/094,299; filed Jun. 9, 1998; (pending).
U.S. Ser. No. 08/576,466; filed Dec. 21, 1995; (allowed).
U.S. Ser. No. 08/807,295; filed Feb. 27, 1997; (allowed).
U.S. Ser. No. 09/294,444; filed Aug. 17, 1998; (pending).
U.S. Ser. No. 08/818,108; filed Mar. 13, 1997; issued as U.S. Patent No. 5,958,803.
U.S. Ser. No. 08/848,228; filed Apr. 30, 1997; (allowed) U.S. Pat. No. 5,979,828.

*Primary Examiner*—Michael J. Carone
*Assistant Examiner*—Son T. Nguyen
*Attorney, Agent, or Firm*—Harness Dickey & Pierce P.L.C.

[57] ABSTRACT

An auxiliary inlet (60) for a jet engine has a first rod block (62) attached to a first side (64) of a hole (66) in a skin (68) of an inlet of the jet engine. A second rod block (80) is attached to an opposing side (82) of the hole (66) in the skin (68) of the inlet of the jet engine. A first reinforced elastomer section (70) is attached to the first rod block (62). A center beam (74) has a first side attached to the first reinforced elastomer section (70). A second reinforced elastomer section (78) is attached to the second rod block (80) and attached to the center beam (74). An actuation system (88, 90) is connected to an intake end of the center beam (74). The actuation system (88, 90) moves the center beam (74) from a first in-moldline position to a second out-of-moldline position.

19 Claims, 5 Drawing Sheets

FIG 6
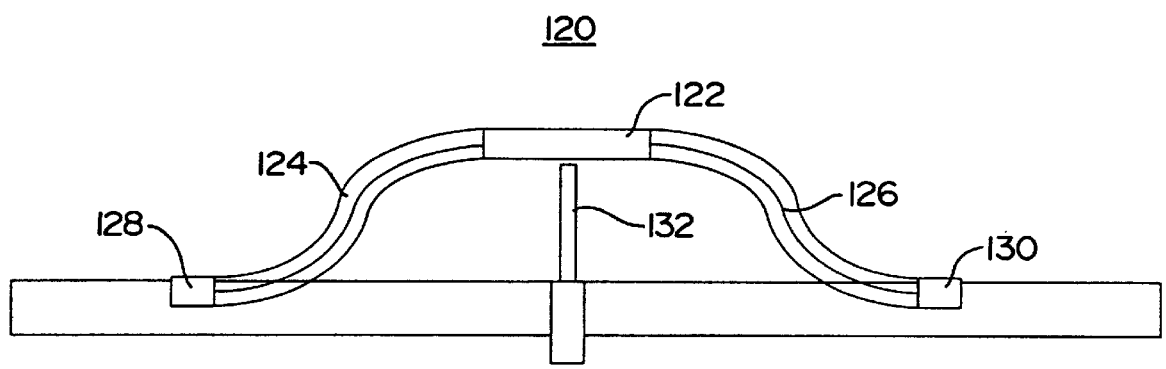
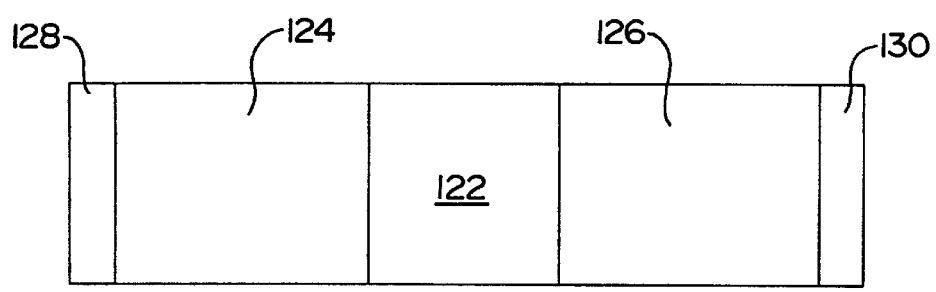
FIG 7 us 6,079,667

AUXILIARY INLET FOR A JET ENGINE

FIELD OF THE INVENTION

The present invention relates generally to the field of aircraft and more particularly to an auxiliary inlet for a jet engine.

BACKGROUND OF THE INVENTION

Auxiliary inlets for jet engines are used to increase the air flow capture area of the inlet at high angles of attack and low air speed situations. Present auxiliary inlets are usually trap doors that have hinges that create turbulence, limiting aircraft performance. In addition, present auxiliary inlets are open on the sides which allows air to spill out the sides. This limits the effectiveness of the auxiliary inlet.

Thus there exists a need for an auxiliary inlet that does not have a hinge that creates turbulence and which does not have open sides.

SUMMARY OF THE INVENTION

An auxiliary inlet for a jet engine that overcomes these and other problems has a first rod block attached to a first side of a hole in a skin of an inlet of the jet engine. A second rod block is attached to an opposing side of the hole in the skin of the inlet of the jet engine. A first reinforced elastomer section is attached to the first rod block. A center beam has a first side attached to the first reinforced elastomer section. A second reinforced elastomer section is attached to the second rod block and attached to the center beam. An actuation system is connected to an intake end of the center beam. The actuation system moves the center beam from a first in-moldline position to a second out-of-moldline position.

BRIEF DESCRIPTION OF THE DRAWINGS

FIG. 6 is a cross sectional view of an auxiliary inlet for a jet engine in accordance with one embodiment of the invention;

FIG. 7 is a partial top view of an auxiliary inlet of FIG. 6; and

DETAILED DESCRIPTION OF THE DRAWINGS

Figure 1:
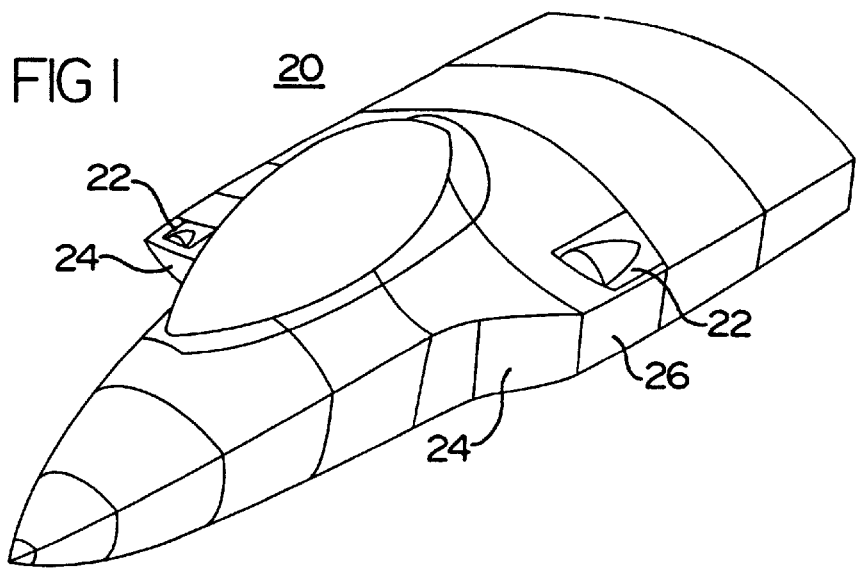
FIG. 1 is a partial perspective view of an aircraft having an auxiliary inlet for a jet engine in accordance with one embodiment of the invention.

FIG. 1 is a partial perspective view of an aircraft 20 having an auxiliary inlet 22 for a jet engine in accordance with one embodiment of the invention. The auxiliary inlet 22 is mounted on the inlet 24 and together they form an intake system for the jet engine. The auxiliary inlet is shown in an expanded position (out-of-moldline position). The inlet 24 has an outer skin 26 and is attached to an intake side of the jet engine. The auxiliary inlet 22 increases the quantity of air captured at high angles of attack and/or at slow speeds.

Figure 2:
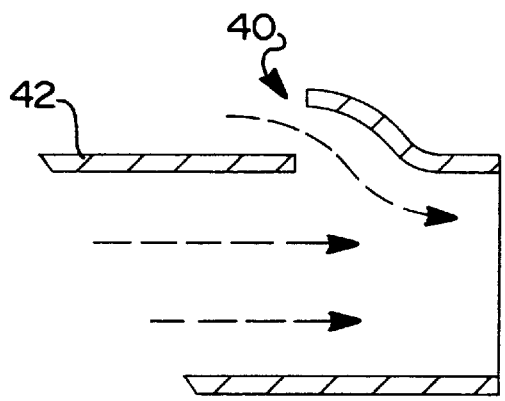
FIG. 2 is a schematic diagram of an auxiliary inlet for a jet engine in accordance with one embodiment of the invention.

FIG. 2 is a schematic diagram of an auxiliary inlet 40 for a jet engine in accordance with one embodiment of the invention. In this embodiment the auxiliary inlet 40 extends outside the inlet's 42 moldline. Additional air is scooped into the inlet 42 by this embodiment of the auxiliary inlet 40.

Figure 3:
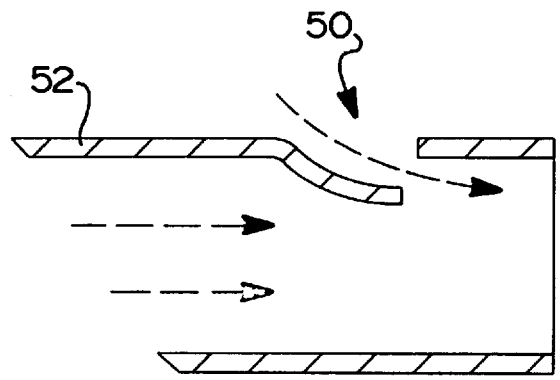
FIG. 3 is a schematic diagram of an auxiliary inlet for a jet engine in accordance with one embodiment of the invention.

FIG. 3 is a is a schematic diagram of an auxiliary inlet 50 for a jet engine in accordance with one embodiment of the invention. In this embodiment the auxiliary inlet 50 extends inside of the inlet's 52 moldline. Each inlet design has its advantages and disadvantages.

Figure 4:
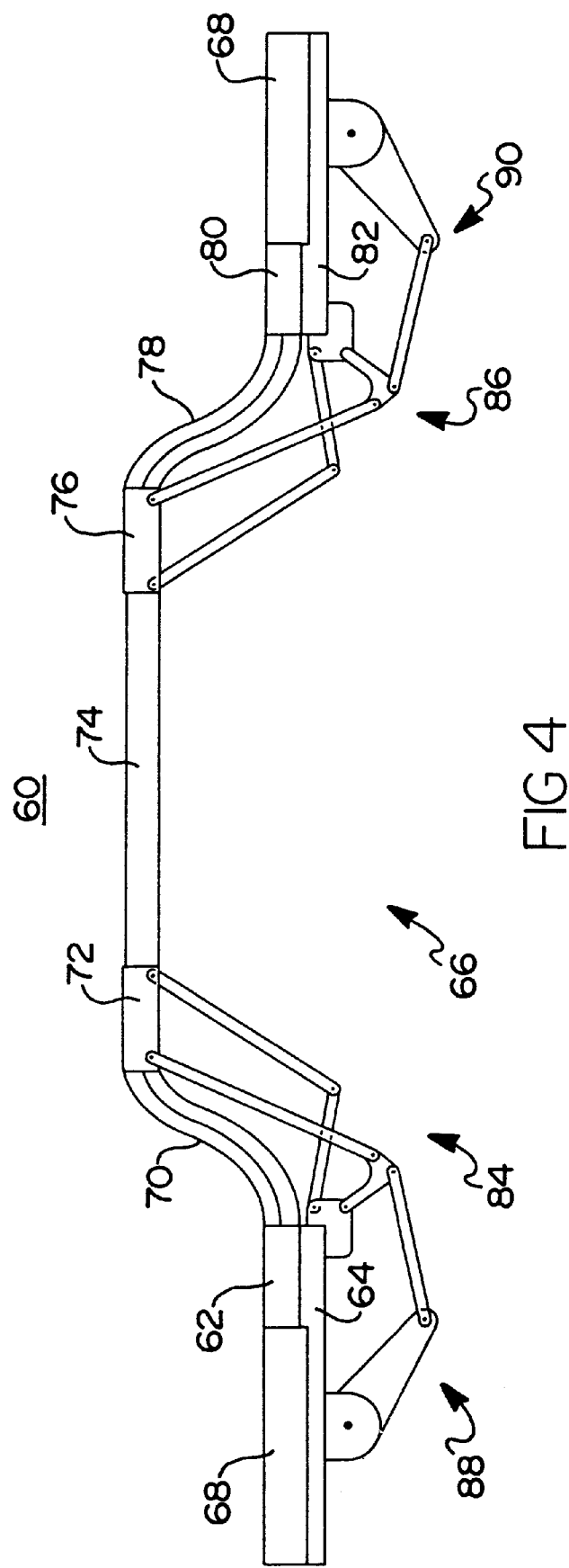
FIG. 4 is a cross sectional view of an auxiliary inlet for a jet engine in accordance with one embodiment of the invention.

FIG. 4 is a cross sectional view of an auxiliary inlet 60 for a jet engine in accordance with one embodiment of the invention. The auxiliary inlet 60 has a first rod block 62 attached to a first side of a hole 66 in a skin 68 of the inlet of the jet engine. A first reinforced elastomer section 70 is attached to the first rod block 62 and a first center rod block 72. The function and operation of the rod blocks 62, 72 and the reinforced elastomer section 70 will be described in more detail with respect to FIG. 8. A center beam 74 is attached to the first center rod block 72 and attached to a second center rod block 76. A second reinforced elastomer section 78 is attached to the second center rod block 76 and the second rod block 80. The second rod block 80 is connected to an opposing side 82 of the hole 66. A pair of six bar hinges 84, 86 connect the center beam 74 to the inlet. The first one of the pair of six bar hinges 84 is connected between the first side (one side) 64 of the perimeter of the hole 66 and the center beam 74 or first center rod block 72. The second one of the pair of six bar hinges 86 is connected between the opposing side 82 of the hole 66 and the center beam 74 or the second center rod block 76. An actuation system 88, 90 moves the auxiliary inlet 60 from a first in-moldline position to a second out-of-moldline position. The reinforced elastomer sections 70, 78 form smooth curvilinear surfaces throughout the operating range of the auxiliary inlet 60. This provides closed side surfaces for the auxiliary inlet 60 that do not allow the air to spill out the sides and provides a smooth surface to reduce turbulence.

Figure 5:
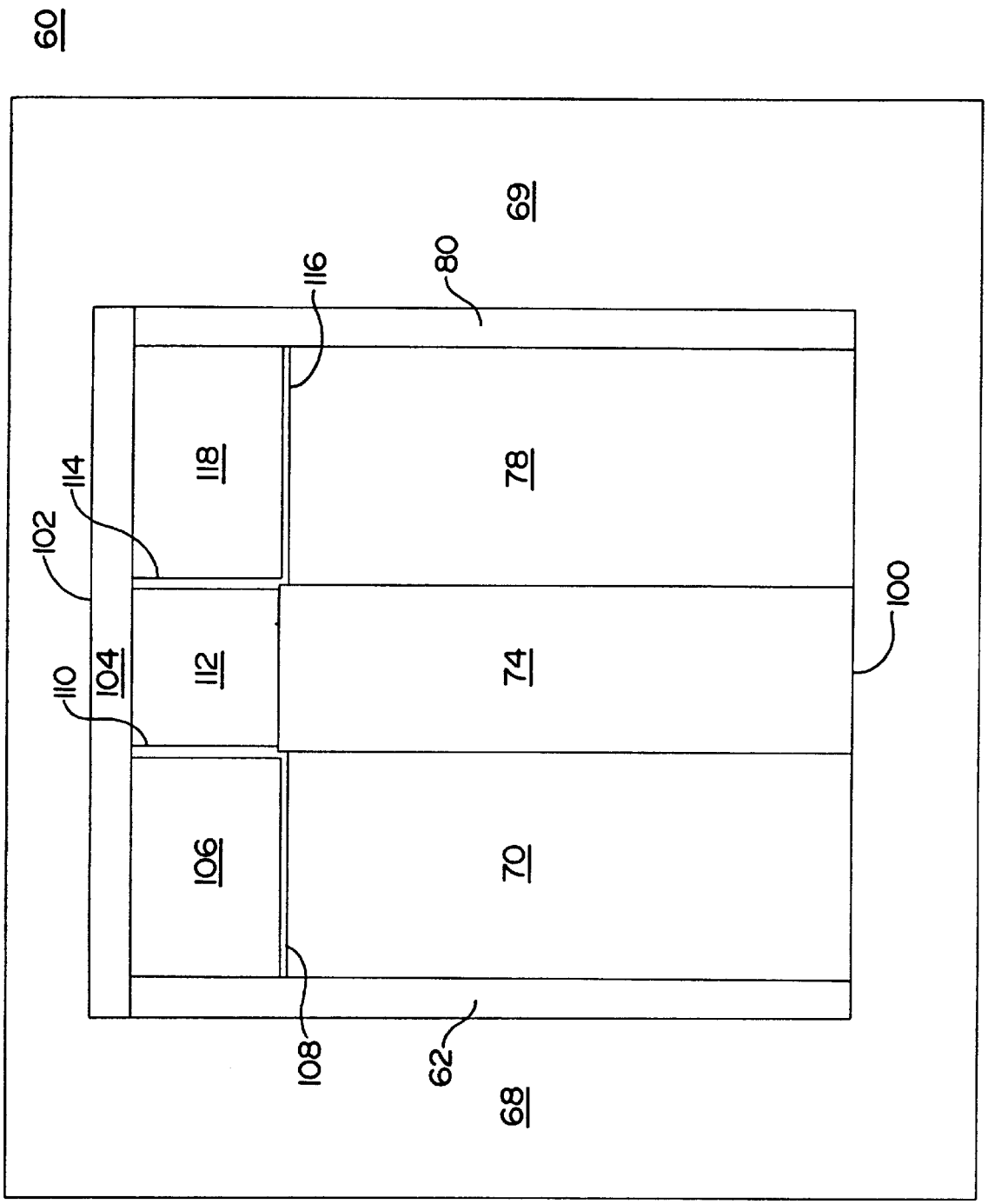
FIG. 5 is a top view of an auxiliary inlet for a jet engine in accordance with one embodiment of the invention.

FIG. 5 is a top view of an auxiliary inlet 60 for a jet engine in accordance with one embodiment of the invention. This view shows an intake side 100 of the auxiliary inlet 60 and the closed side 102 of the auxiliary inlet 60. A third rod block 104 is attached to the closed side 102 of the auxiliary inlet 60. A third reinforced elastomer section is attached to the third rod block 104 and attached to a closed end of the second reinforced elastomer section. The third reinforced elastomer section includes a first subsection 106 having a plurality of crossed reinforcing rods. A first strut 108 is connected between the first rod block 62 and the center beam 74 and adjacent to a first side of the first subsection 106. The strut 108 is a flexible material such as a composite, but is more rigid than the elastomer. The first strut 108 provides stability at the junction between the first reinforced elastomer section 70 and the first subsection 106. A second strut 110 is connected between the third rod block 104 and the center beam 74. The second strut 110 is adjacent to a second side of the first subsection 106. A middle subsection 112 has a plurality of parallel reinforcing rods running between the center beam 74 and the third rod block 104. A third strut 114 is attached between the third rod block 104 and the center beam 74. The third strut 114 is attached to a second side of the middle subsection 112. A fourth strut 116 is attached between the second rod block 80 and the center beam 74. A second subsection 118 has a plurality of crossed reinforcing rods. The second subsection 118 is attached to the third strut 114 and the fourth strut 116. The third elastomer section provides a smooth curvilinear transition from the closed end 102 to the center beam 74. This requires the first and second subsections 106, 118 to bend and twist. As a result, these sections have the crossed reinforcing rods. This results in the auxiliary inlet not having any hinges that create turbulence.

FIG. 6 is a cross sectional view of an auxiliary inlet 120 for a jet engine in accordance with one embodiment of the invention. This view shows a center beam 122 attached to a pair of reinforced elastomer sections 124, 126. The reinforced elastomer sections 124, 126 are attached to rod blocks 128, 130. A linear actuator 132 is connected to the center beam 122. FIG. 7 is a partial top view of the auxiliary inlet 120 of FIG. 6.

Figure 8:
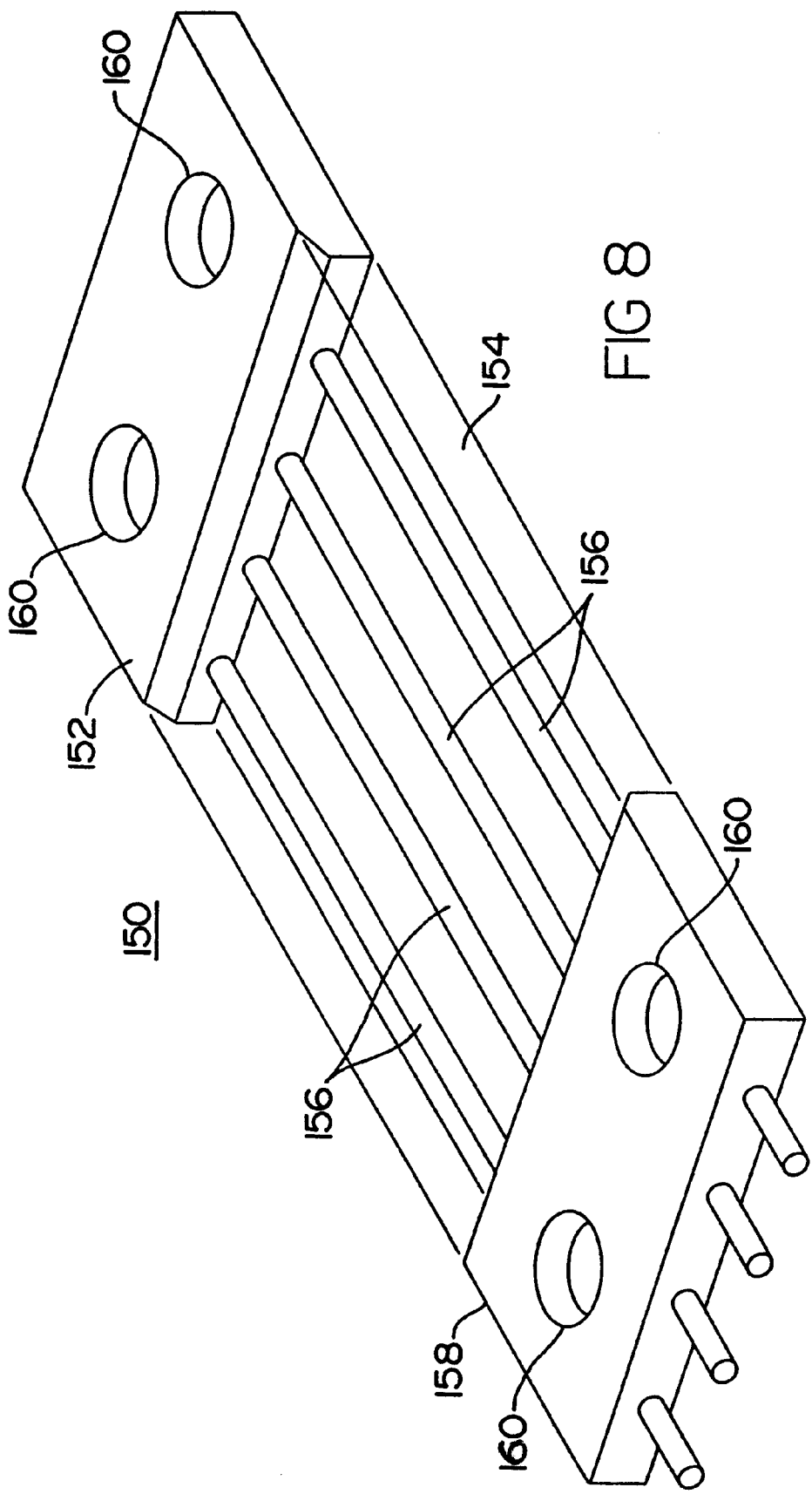
FIG. 8 is a perspective view of a reinforced elastomer panel.

FIG. 8 is a perspective view of a reinforced elastomer panel 150. The elastomer panel 150 has a rod block 152 attached along one edge to an elastomer skin 154. The elastomer skin 154 is capable of stretching to 100% of its unstressed length. In addition, the elastomer skin 154 is capable of twisting. A plurality of rods 156 are attached to the rod block 152 and are allowed to slide freely inside the elastomer skin 154. The rods 156 are made from quartz, epoxy or composites and flex without breaking. The stiffness of these reinforcements is designed to yield a specific expanded shape. The rods 156 slide freely inside a second rod block 158. The rods 156 provide the elastomer skin (elastomer sheet) 154 with a smooth curvilinear shape when the elastomer panel 150 is elongated, deflected or twisted. This curvilinear shape provides a good aerodynamic shape without any discontinuities that cause turbulence and drag. A plurality of attachment provisions 160 are used to attach the elastomer panel 150 to the aircraft. In the first subsection 106 and second subsection 118 the reinforcing rods run both lengthwise and widthwise. Both sets of reinforcing rods are attached at one end and slide freely through the other side. Whether the rods slide through the rod block 104 (108) or the struts 108 (110), is a design choice.

Thus there has been described an auxiliary inlet for an aircraft that does not have a hinge that creates turbulence and which does not have open sides.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An auxiliary air intake system for an aircraft having a jet engine, the system capable of being controlled to provide an auxiliary air inlet opening of variable cross sectional dimensions and without forming gaps or discontinuities in a surface of said aircraft, said system comprising:

an inlet having an outer skin, the inlet attached to an intake side of the jet turbine;

the outer skin having a hole having a rigid perimeter along three sides thereof;

a first reinforced elastomer section attached to a first portion of the rigid perimeter along a first side of the hole;

a center beam having a first side attached to the first reinforced elastomer section;

a second reinforced elastomer section attached to a second side of the center beam and attached to a second portion of the rigid perimeter along a second side of the hole;

a third reinforced elastomer section operably coupled to a third portion of the rigid perimeter of the hole, and to the center beam, to enable movement of the center beam while without forming a gap or surface discontinuity at the third portion of the rigid perimeter; and an actuation system for urging an intake end of the center beam from a first in-moldline position to a second out-of-moldline position to thereby controllably vary the cross sectional area of the auxiliary air inlet opening without forming gaps or surface discontinuities in the outer skin.

2. The intake system of claim 1, wherein the third reinforced elastomer section is attached to a closed end of the first reinforced elastomer section and attached to a closed end of the second reinforced elastomer section.

3. The intake system of claim 2, wherein the third reinforced elastomer section includes a first subsection having a plurality of crossed rods, a middle subsection with a plurality of parallel rods and a second subsection having a plurality of crossed rods.

4. The intake system of claim 3, wherein the first reinforced elastomer section has a plurality of reinforcing rods that are attached to the center beam and slide freely inside an elastomer sheet and inside the first portion of the rigid perimeter.

5. The intake system of claim 4, wherein the second reinforced elastomer section has a plurality of reinforcing rods that are attached to the center beam and slide freely inside an elastomer sheet and inside the second portion side of the rigid perimeter.

6. The intake system of claim 1, wherein the actuation system is a linear actuator.

7. The intake system of claim 1, wherein the actuation system includes a pair of six bar hinges, one of the pair of six bar hinges connected between the first portion of the rigid perimeter and the center beam, and a second one of the pair of six bar hinges connected between the second portion of the perimeter and the center beam.

8. An auxiliary air inlet for a jet engine which can be controlled to provide an auxiliary air inlet opening without forming gaps or discontinuities in a skin of the aircraft adjacent to the auxiliary air inlet opening, the auxiliary air inlet, comprising:

a first rod block attached to a first side of a hole in the skin of an inlet of the jet engine;

a second rod block attached to an opposing side of the hole in the skin of the inlet of the jet engine;

a first reinforced elastomer section attached to the first rod block;

a center beam having a first side attached to the first reinforced elastomer section;

a second reinforced elastomer section attached to the second rod block and attached to the center beam;

a third reinforced elastomer section attached to a closed side of the hole and to a closed end of the center beam; and an actuation system connected to an intake end of the center beam, the actuation system moving the center beam from a first in-moldline position, wherein the auxiliary air inlet opening is closed, to a second out-of-moldline position, wherein the auxiliary air inlet opening is open, without forming gaps or surface discontinuities in the skin at areas adjacent to the first, second and third reinforced elastomeric sections.

9. The auxiliary inlet of claim 8, wherein the second out-of-moldline position results in the center beam expanding out of the inlet.

10. The auxiliary inlet of claim 8, wherein the second out-of-moldline position results in the center beam indenting into the inlet.

11. The auxiliary inlet of claim 9, further including a third rod block attached to the closed side of the hole, the third reinforced elastomer section being attached to the third rod block and attached to the closed end of the first reinforced elastomer section and attached to a closed end of the second reinforced elastomer section.

12. The auxiliary inlet of claim 11, wherein the third reinforced elastomer section comprises:
- a first subsection having a plurality of crossed reinforcing rods, the plurality of crossed reinforcing rods sliding freely inside an elastomer sheet;
- a first strut connected between the first rod block and the center beam and adjacent to a first side of the first subsection;
- a second strut connected between the third rod block and the center beam and adjacent to a second side of the first subsection;
- a middle subsection having a plurality of parallel reinforcing rods running between the center beam and the third rod block, the middle subsection having a first side attached to the second strut;
- a third strut attached between the third rod block and the center beam and attached to a second side of the middle subsection;
- a fourth strut attached between the second rod block and the center beam; and
- a second subsection having a plurality of crossed reinforcing rods, the plurality of crossed reinforcing rods sliding freely inside an elastomer sheet, the second subsection is attached to the third strut and the fourth strut.

13. The auxiliary inlet of claim 8, wherein the actuation system is a linear actuator.

14. The auxiliary inlet of claim 8, wherein the actuation system includes a pair of six bar hinges, one of the pair of six bar hinges connected between the first side of the hole and the center beam and a second of the pair of six bar hinges connected between the opposing side of the hole and the center beam.

15. The auxiliary inlet of claim 8, wherein the first reinforced elastomer section has a plurality of reinforcing rods that are attached to the center beam and slide freely inside an elastomer sheet and inside the first rod block.

16. The intake system of claim 8, wherein the second reinforced elastomer section has a plurality of reinforcing rods that are attached to the center beam and slide freely inside an elastomer sheet and inside the second rod block.

17. An auxiliary inlet for a jet engine, comprising:
- a first rod block attached to a first side of a hole in a skin of an inlet of the jet engine;
- a second rod block attached to an opposing side of the hole in the skin of the inlet of the jet engine;
- a first reinforced elastomer section attached to the first rod block, the first reinforced elastomer section having a plurality of reinforcing rods that are attached to a center beam and slide freely inside an elastomer sheet and inside the rod block;
- the center beam having a first side attached to the first reinforced elastomer section;
- a second reinforced elastomer section attached to the second rod block and attached to the center beam, the second reinforced elastomer section having a plurality of reinforcing rods that are attached to the center beam and slide freely inside an elastomer sheet and inside the second rod block;
- a third rod block attached to a closed end of the hole;
- a third reinforced elastomer section attached to the third rod block and attached to a closed end of the first reinforced elastomer section and attached to a closed end of the second reinforced elastomer skin;
- the third reinforced elastomer section comprises:
  - a first subsection having a plurality of crossed reinforcing rods, the plurality of crossed reinforced rods sliding freely inside a n elastomer sheet;
  - a first strut connected between the first rod block and the center beam and adjacent to a first side of the first subsection;
  - a second strut connected between the third rod block and the center beam and adjacent to a second side of the first subsection;
  - a middle subsection having a plurality of parallel reinforcing rods running between the center beam and the third rod block, the middle subsection having a first side attached to the second strut;
  - a third strut attached between the third rod block and the center beam and attached to a second side of the middle subsection;
  - a fourth strut attached between the second rod block and the center beam; and
  - a second subsection having a plurality of crossed reinforcing rods, the plurality of crossed reinforcing rods sliding freely inside an elastomer sheet, the second subsection attached to the third strut and the fourth strut;
- an actuation system connected to an intake end of the center beam, the actuation system moving the center beam from a first in-moldline position to a second out-of-moldline position without forming discontinuities or gaps in the skin adjacent the first, second and third rod blocks.

18. An auxiliary air inlet for a jet engine of an aircraft capable of being moved between an open position and a closed position without forming gaps or surface discontinuities in a skin of the aircraft at areas adjacent an auxiliary airflow opening formed by the auxiliary air inlet, the auxiliary air inlet comprising;
- a generally rigid center beam having a length substantially in accordance with a length of an opening formed in the skin;
- a first reinforced elastomeric panel coupled between a first edge of the opening and a first side of the center beam;
- a second reinforced elastomeric panel coupled between a second edge of the opening and a second side of the center beam;
- a third reinforced elastomeric panel coupled between a closed end of the center beam and a third edge of the opening; and
- an actuation system operably associated with the center beam for urging the center beam between an open position, wherein the auxiliary air inlet allows an auxiliary airflow through the auxiliary airflow opening into the jet engine, and a closed position wherein the auxiliary air inlet closes off the auxiliary airflow opening.

19. A method for forming an auxiliary airflow inlet in an intake structure for an aircraft having a jet engine, the method comprising the steps of:

disposing a generally rigid center beam over an opening formed in a skin of the aircraft on the intake structure;

using a first reinforced elastomeric panel to couple a first side of the center beam to a first edge of the opening;

using a second reinforced elastomeric panel to couple a second side of the center beam to a second edge of the opening;

using a third reinforced elastomeric panel to couple a third side of the center beam to a third edge of the opening; and using an actuating member to urge the center beam between an open position, wherein an auxiliary airflow can enter through the auxiliary airflow inlet, and a closed position wherein the auxiliary airflow inlet is closed to prevent airflow therethrough, and without forming gaps or surface discontinuities in the skin adjacent the first, second and third edges of the opening.

* * * * *